C. POOR,

Assignor to S. S. WHITE.

Dental-Drill.

No. 8,624. Reissued Mar. 11, 1879.

*INVENTOR*

*Chandler Poor*

*WITNESSES*

*Wm A Skinkle*

*Geo W Breck*

*By his Attorneys*

*Baldwin, Hopkins & Peyton.*

N. PETERS, PHOTO-LITHOGRAPHER, WASHINGTON, D. C.

C. POOR,
Assignor to S. S. WHITE.
Dental-Drill.

No. 8,624. Reissued Mar. 11, 1879.

WITNESSES
Wm. A. Skinkle
Geo. W. Brick

INVENTOR
Chandler Poor
By his Attorneys
Baldwin, Hopkins & Peyton.

N. PETERS, PHOTO-LITHOGRAPHER, WASHINGTON, D. C.

UNITED STATES PATENT OFFICE.

CHANDLER POOR, OF DUBUQUE, IOWA, ASSIGNOR TO SAMUEL S. WHITE, OF PHILADELPHIA, PENNSYLVANIA.

IMPROVEMENT IN DENTAL DRILLS.

Specification forming part of Letters Patent No. 118,268, dated August 22, 1871; Reissue No. 8,065, dated January 29, 1878; Reissue No. 8,624, dated March 11, 1879; application filed January 20, 1879.

*To all whom it may concern:*

Be it known that I, CHANDLER POOR, of the city and county of Dubuque, in the State of Iowa, have invented certain new and useful Improvements in Dental Burr-Lathes, now commonly called "Dental Engines," of which the following is a specification:

This invention relates to apparatus for revolving the burring or milling tools used by dentists for drilling and cleaning cavities in decayed teeth; and it consists of certain new combinations of devices, which are recited at the close of the specification.

The said apparatus as constructed by me comprises a vibrating stand or arm holding belt-pulleys and a belt for transmitting a rapid rotary motion, a spindle carried by said arm, and also a flexible shaft or cord, which is connected with said spindle, and is employed to transmit motion to the spindle tool holder or chuck revolving on its longitudinal axis, and carrying the burring or drilling tool.

The said apparatus also comprises the hand-piece in which the spindle tool-holder revolves, and by which it can be manipulated as required for operating upon the teeth.

Figure 1:
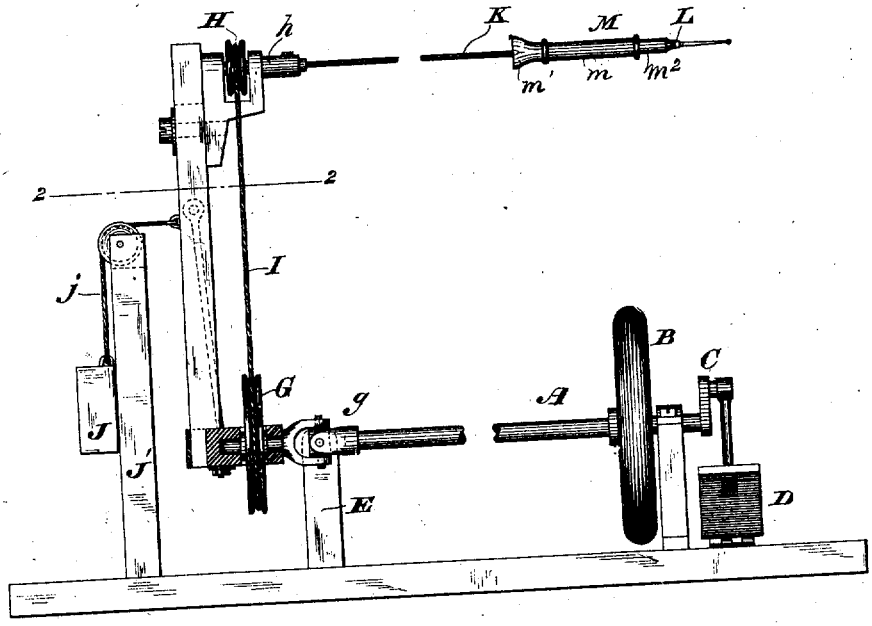
Figure 2:
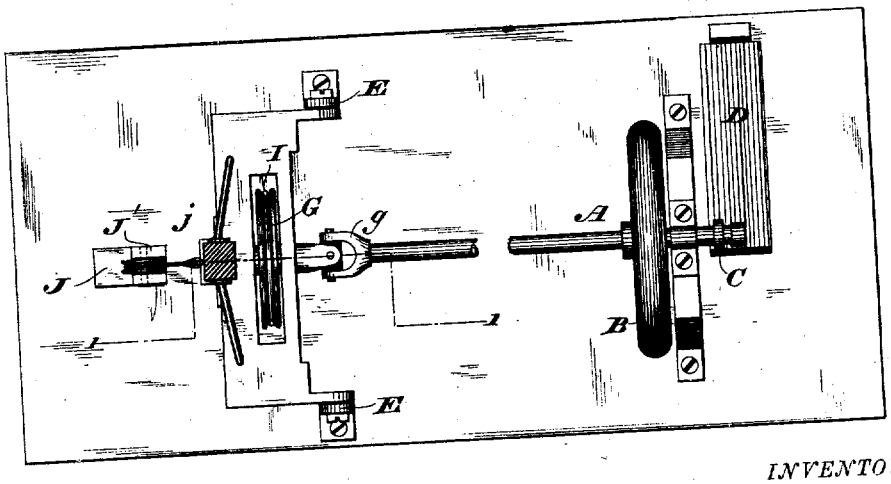
Figure 3:
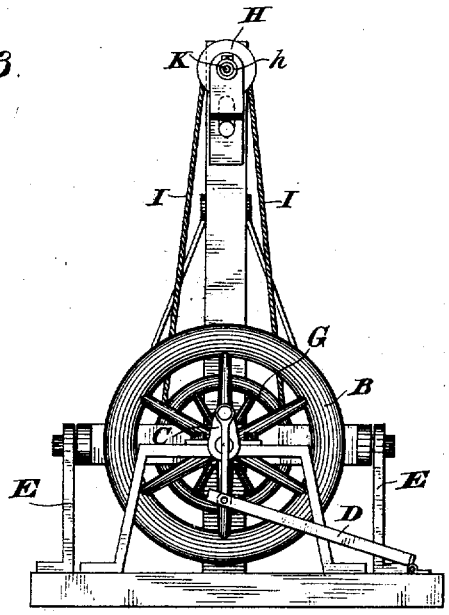

In the accompanying drawings, which show the best way known to me of embodying my improvements previous to the date of my application for the original patent, Figure 1 represents a side elevation of my improved apparatus, partly in section, on the line 1 1 of Fig. 2; Fig. 2, a top or plan view thereof, partly in section, on the line 2 2 of Fig. 1; Fig. 3, a front elevation with the flexible driving-shaft removed; and Fig. 4, a longitudinal central section of the hand-piece casing, the front end of the tool-chuck being also in section to show the manner of fastening the shank of the operating-tool therein.

A driving-shaft, A, provided with a balance-wheel, B, is connected by a crank, C, with a foot-treadle, D. The driving-shaft is mounted in suitable bearings or standards on the floor or bed-plate, and extends from the back of the operating-chair, where I prefer to locate the treadle, to the front of the chair, where I prefer to locate the vibrating arm or frame, which vibrates on pivots upon a suitable standard, arms, or supports, E E, and which carries near its upper end the spindle *h*, from which power is transmitted to the tool holder or chuck. The vibrating arm is provided at its lower end with a driving-pulley, G, and at its upper end with a smaller pulley, H, which is mounted upon the spindle *h*, the two pulleys being of any proper relative size to multiply the revolutions, and being connected together by a driving-belt, I. The driving-shaft, to which motion is imparted by the treadle, is connected with the shaft of the pulley G by a universal joint, *g*, by which means, in the organization shown, the free vibration of the vibrating arm is permitted without interfering with the operation of the treadle.

To keep the rocking arm in a normally upright position, I provide it with a counter-balance, consisting, in the present instance, of a weight, J, suspended by a cord, *j*, passing from the back of the frame over a pulley mounted in an upright, J′.

One end of the spindle *h* of the upper pulley, H, is extended beyond the face of the vibrating stand or arm, and to it is connected one end of a flexible power-conveyer, K, composed, in the present instance, of a cat-gut cord, the outer or free end of which is connected with the inner or butt end of the spindle-chuck, tool-holder, or mandrel L, which is constructed to revolve on its longitudinal axis, is mounted in a tubular hand-piece casing, M, and imparts rotary motion to the tool fastened in it, the butt-end of the casing being open for the transmission of motion to the butt of the spindle-chuck.

It will be noticed that the spindle *h*, at the upper end of the vibrating arm, is arranged in a direction crosswise of the axial line of the pivots of the base upon which the rocking arm vibrates. Consequently, the said arm and the spindle carried by it can be vibrated in the direction of the length of that spindle, and in the normal direction of the length of the flexible shaft connected with said spindle.

By the mode of construction and arrangement represented in the drawings and above described the power necessary to drive the engine is imparted by the foot of the operator to the treadle, whence it is communicated through the driving mechanism, mounted on the vibrating arm or stand, to the flexible shaft, and thence to the tool-chuck mounted in the casing of the hand-piece. Owing to the flexibility of the power-conveyer K, the hand-piece carrying the operating-tool is free to be moved in all directions within the length of said conveyer without interrupting the transmission of the driving power; and, as the stand or arm is capable of vibrating on its pivots, any excess of movement desired by the operator for the hand-piece beyond that afforded by the length of the flexible conveyer or shaft can be obtained by pulling upon the hand-piece, and thereby vibrating the arm, which, when the strain is released, is immediately returned to its normal or upright position by the counter-balance.

Figure 4:
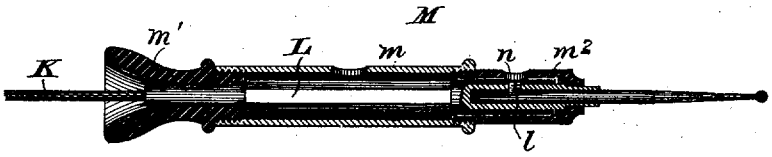

I will now describe in detail the construction of the hand-piece of the engine, referring particularly to Fig. 4 of the drawings. This hand-piece is composed of two principal parts—viz., the tubular casing M, and the mandrel or spindle-chuck L, which extends through said casing.

The casing is composed of a main or handle portion, *m*, and end pieces $m^1$ $m^2$. These end pieces are tubular, with bores of smaller diameter than the main portion, and they form bearings in which the reduced cylindrical extremities of the mandrel revolve as journals, while the tubular form of the end pieces permits the front end of the mandrel to protrude at the front end of the casing, and makes the casing open at its butt, so that the rear end or butt of the mandrel may be connected with the flexible power-conveyer and may be revolved by it. The front end of the mandrel is constructed with a socket, in which the tool can be inserted and fastened, so that the mandrel constitutes a spindle-chuck.

The end pieces $m^1$ $m^2$ are connected with the main or handle portion of the casing by screw-threads, so as to be detachable therefrom; and their bores are of smaller diameter than that of the adjacent parts of the mandrel or spindle-chuck, so that the annular end surfaces of these tubular bearings abut against the corresponding annular surfaces or shoulders of the spindle-chuck, and constitute end bearings, by which the spindle-chuck, which, as represented, extends through both tubular bearings, is prevented from unsteady and endwise movement when the bearings are properly adjusted; consequently, the operating-tool carried by the chuck runs true and firm, which is a great advantage. There is also less friction between the chuck and enveloping casing when constructed with journal-bearings at front and rear ends than when the chuck is in contact with the sides of the casing throughout its entire length.

By making the rear tubular bearing detachable the spindle-chuck can be drawn out endwise from the casing, when that is desirable or necessary, without necessitating its disconnection from the flexible shaft or power-conveyer, and when properly adjusted said tubular bearing will hold the chuck against endwise movement without interfering with the connection of its rear end with the power-conveyer.

By the construction described it will also be seen that the casing possesses the capacity of turning upon the chuck without interrupting its free rotation therein, by which means the hand-piece, while free to be moved in various directions by the flexure of the power-conveyer, is also capable of swiveling freely to conform to the turning movements of the operator's hand. This swiveling or turning capacity of the hand-piece casing is due to the fact that it is not connected rigidly with any sheath or tube covering the flexible conveyer.

This swiveling feature, however, broadly considered, is not of my invention, being old and well known.

The operating-tools are securely fastened in the socket of the chuck by means of a movable fastening, consisting, in the example represented in the drawings, of a set-screw, *l*, which is carried by and revolves with the chuck, and fits in an aperture or hole formed in the forward end of the chuck at right angles to and opening into the socket. The end of the fastening comes in contact with and bears firmly against the side of the tool-shank, which is preferably provided with a flat surface, and secures it in place, preventing either longitudinal or rotary movement of the tool independent of the chuck.

The fastening must necessarily be removed or disengaged from the tool-shank before the latter can be removed from the chuck; and as the fastening is within the surrounding casing it would be necessary, if some means of access were not provided, to withdraw the chuck from the casing to manipulate the fastening. To obviate such withdrawal I form an opening or aperture, *n*, in the casing, through which access is had to the movable fastening to manipulate it, and as the chuck is prevented from endwise movement in the casing the movable fastening is always in line with the opening.

I am aware that it is not new, and I do not broadly claim, the fastening or locking a tool in a rotary socket through an opening in an enveloping-casing. This method of fastening or locking has heretofore been attempted; but the chuck carrying the fastening was not positively secured against endwise movement, and the construction is such that only tools with very long shanks can be used, the tool lock or fastening, chuck, and openings being located at the rear of the hand-piece.

I am also aware that a hand-piece having removable sections, with a rotating chuck or tool-holder mounted in one of said removable sections, and driven by a flexible shaft, is shown in Letters Patent No. 118,237, granted to Alexander Hartman August 22, 1871, and do not, therefore, broadly claim anything shown in said patent. I hereby expressly concede to Hartman priority of invention of the devices shown in his said patent.

I claim as my invention—

1. The combination, substantially as hereinbefore set forth, of a standard or base, a vibrating arm or frame pivoted to the said standard, a counter-balance acting on the vibrating arm, a driving-pulley at the lower end of the vibrating arm, a spindle at the upper end of said arm, and arranged crosswise of the axial line of the pivots on which said arm vibrates, a driven pulley mounted upon said spindle and vibrating with said arm, a belt-connection between the pulleys, a flexible power-conveyer connected with the said spindle, in the normal direction of the length of which and of the said spindle the rocking arm vibrates, and a rotary tool-chuck or mandrel driven thereby.

2. The combination, substantially as set forth, of a standard, a vibrating arm or stand pivoted thereon, carrying a spindle arranged crosswise of the axial line of the pivots on which said arm vibrates, a flexible power-conveyer connected with said spindle, a counter-balance acting on the rocking arm to hold it normally in an upright position, while permitting it to be moved therefrom in the normal direction of the length of said spindle and conveyer, belt-pulleys and a belt for transmitting motion to said spindle, and a foot-treadle and driving-shaft for imparting motion to said belt-pulleys.

3. The combination, substantially as hereinbefore set forth, of the tubular hand-piece casing provided at its ends with detachable tubular bearings, and the spindle-chuck, which is extended through both of said end bearings, is provided at its front end with a socket for the tool, and has annular shoulders which abut against said end bearings.

4. The combination, substantially as before set forth, of a spindle-chuck, and a tool-fastening therefor, with a tubular hand-piece casing surrounding the said spindle-chuck, open at its butt-end for the transmission of motion to the butt of said spindle, fitted with detachable tubular end bearings to prevent the endwise movement of said spindle-chuck, and having an opening in its side to permit access to be had to the tool-fastening device of the spindle-chuck.

5. The combination, substantially as before set forth, of the following three members, viz: first, a flexible power-conveyer; second, a tubular hand-piece casing provided at its ends with detachable tubular end bearings; third, the spindle-chuck, which is extended through both of said tubular end bearings, and is connected at its butt with the flexible conveyer, the hand-piece casing of said combination being free of any rigid connection, which prevents it from being turned axially of the spindle-chuck.

CHANDLER POOR.

Witnesses:
E. C. CLARK,
W. S. WRIGHT.